US012670019B2

(12) United States Patent
Wei et al.

(10) Patent No.: US 12,670,019 B2
(45) Date of Patent: Jun. 30, 2026

(54) BATCH COMPUTING SYSTEM AND ASSOCIATED METHOD

(71) Applicant: ALIBABA (CHINA) CO., LTD., Zhejiang Province (CN)

(72) Inventors: Xuechao Wei, Beijing (CN); Zhe Zhou, Beijing (CN); Jiejing Zhang, Beijing (CN); Sicheng Li, Sunnyvale, CA (US); Yen-Kuang Chen, Palo Alto, CA (US); Bizhao Shi, Beijing (CN)

(73) Assignee: ALIBABA (CHINA) CO., LTD., Zhejiang Province (CN)

( * ) Notice: Subject to any disclaimer, the term of this patent is extended or adjusted under 35 U.S.C. 154(b) by 571 days.

(21) Appl. No.: 18/323,086

(22) Filed: May 24, 2023

(65) Prior Publication Data

US 2024/0028392 A1 Jan. 25, 2024

(30) Foreign Application Priority Data

Jul. 19, 2022 (CN) .......................... 202210850588.4

(51) Int. Cl.
*G06F 9/48* (2006.01)
*G06N 5/04* (2023.01)

(52) U.S. Cl.
CPC ............. *G06F 9/4881* (2013.01); *G06N 5/04* (2013.01)

(58) Field of Classification Search
CPC .... G06F 9/4881; G06F 9/4843; G06F 9/5027; G06N 5/04; G06N 3/096; G06N 3/045
See application file for complete search history.

(56) References Cited

U.S. PATENT DOCUMENTS 11,442,775 B1 * 9/2022 Yu .......................... G06F 9/4881
11,514,370 B1 * 11/2022 Yu ........................... G06N 3/063
2017/0255496 A1 * 9/2017 Deng .................... G06F 9/5044
(Continued)

OTHER PUBLICATIONS

Jacob Devlin, Ming-Wei Chang, Kenton Lee, and Kristina Toutanova. Bert: Pre-training of Deep Bidirectional Transformers for Language Understanding. arXiv preprint arXiv:1810.04805, 2018.
(Continued)

*Primary Examiner* — Pierre Vital
*Assistant Examiner* — Tuan M Nguyen
(74) *Attorney, Agent, or Firm* — WPAT, P.C.; Anthony King

(57) ABSTRACT

The present disclosure discloses a batch computing system and an associated method. The batch computing system includes a memory, a task manager and an inference computer. The memory stores a shared model parameter set common to a plurality of tasks that is generated by fine tuning a shared model and a task-specific parameter set of each task. The inference computer receives a plurality of task requests, derives a data length and a designated task of each task request, and enables the task manager to read a task-specific parameter set and a shared model parameter set corresponding to each task request. The inference computer further assigns task requests corresponding to the shared model to a plurality of computation batches, performs, in batch, the common computation of designated tasks in each batch computation, and performs task-specific computation operations of the designated tasks of each batch computation.

14 Claims, 5 Drawing Sheets

(56)        References Cited

U.S. PATENT DOCUMENTS

| | | | | |
|---|---|---|---|---|
| 2018/0060125 | A1* | 3/2018 | Bhimani | G06F 9/455 |
| 2021/0209513 | A1* | 7/2021 | Torres | G06F 40/284 |
| 2022/0147669 | A1* | 5/2022 | Quanz | G06F 30/27 |
| 2022/0335610 | A1* | 10/2022 | Shiratani | A61B 1/00 |
| 2022/0383212 | A1* | 12/2022 | Nagahara | G05B 15/02 |
| 2022/0398255 | A1* | 12/2022 | Fenzl | G06F 16/26 |
| 2023/0097319 | A1* | 3/2023 | Lindbo | G06F 9/4881 |
| | | | | 718/107 |

OTHER PUBLICATIONS

Alec Radford, Jeffrey Wu, Rewon Child, David Luan, Dario Amodei, and Ilya Sutskever. Language Models are Unsupervised Multitask Learners. OpenAI blog, 1(8):9, 2019.

Colin Raffel, Noam Shazeer, Adam Roberts, Katherine Lee, Sharan Narang, Michael Matena, Yanqi Zhou, Wei Li, and Peter J Liu. Exploring the Limits of Transfer Learning with a Unified Text-to-Text Transformer. arXiv preprint arXiv:1910.10683, 2019.

Ze Liu, Yutong Lin, Yue Cao, Han Hu, Yixuan Wei, Zheng Zhang, Stephen Lin, and Baining Guo. Swin Transformer: Hierarchical Vision Transformer Using Shifted Windows. arXiv preprint arXiv:2103.14030, 2021.

Neil Houlsby, Andrei Giurgiu, Stanislaw Jastrzebski, Bruna Morrone, Quentin De Laroussilhe, Andrea Gesmundo, Mona Attariyan, and Sylvain Gelly. Parameterefficient transfer learning for NLP. In International Conference on Machine Learning, pp. 2790-2799. PMLR, 2019.

Mengjie Zhao, Tao Lin, Fei Mi, Martin Jaggi, and Hinrich Schutze. Masking as an Efficient Alternative to Finetuning for Pretrained Language Models. arXiv preprint arXiv:2004.12406, 2020.

Demi Guo, Alexander M Rush, and Yoon Kim. Parameter-Efficient Transfer Learning with Diff Pruning. arXiv preprint arXiv:2012.07463, 2020.

Elad Ben Zaken, Shauli Ravfogel, and Yoav Goldberg. BitFit: Simple Parameter-efficient Fine-tuning for Transformer-based Masked Language-models. arXiv preprint arXiv:2106.10199, 2021.

Jiarui Fang, Yang Yu, Chengduo Zhao, and Jie Zhou. TurboTransformers: An Efficient GPU Serving System for Transformer Models. In Proceedings of the 26th ACM SIGPLAN Symposium on Principles and Practice of Parallel Programming, pp. 389-402, 2021.

* cited by examiner

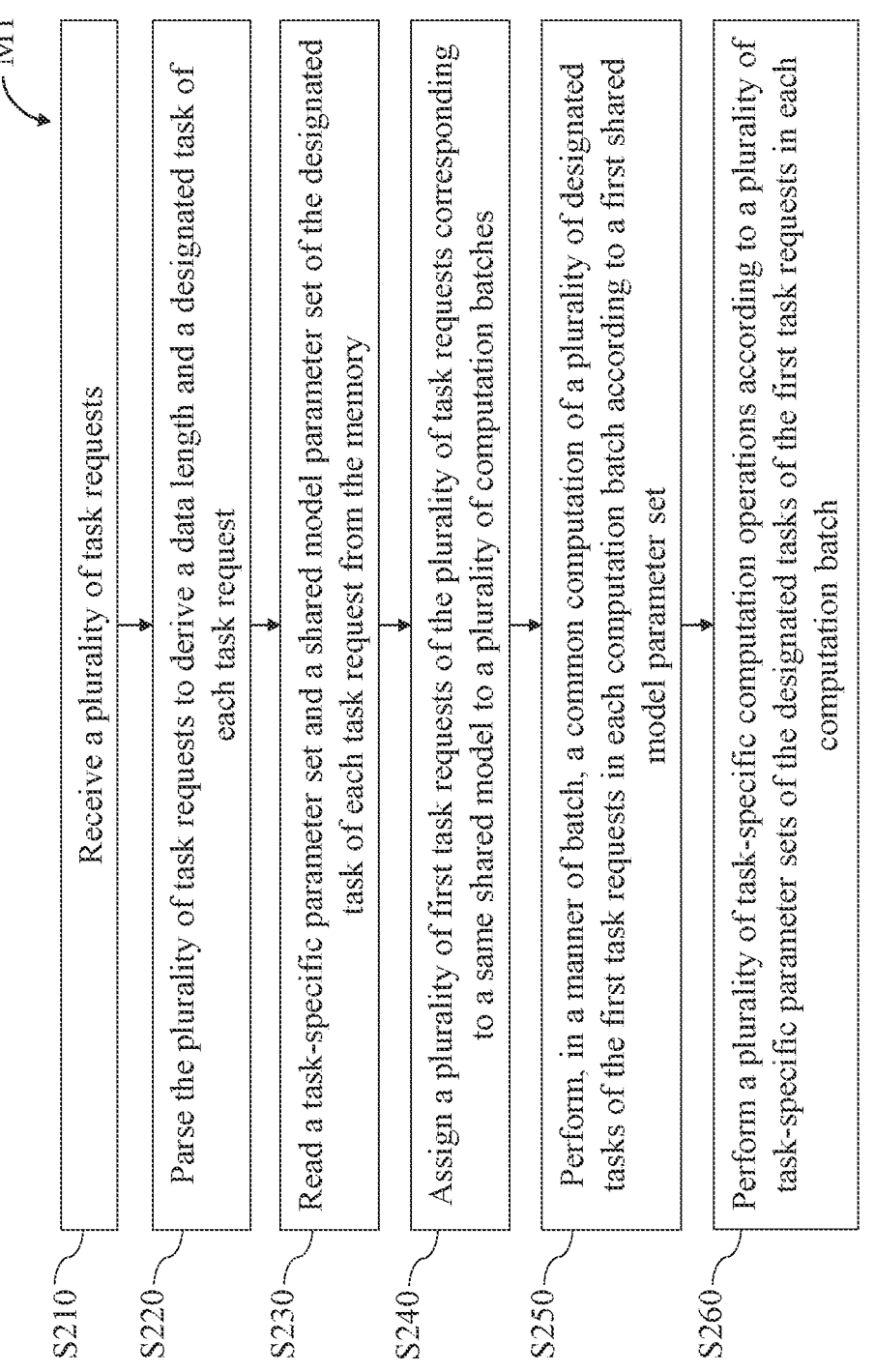

S210 — Receive a plurality of task requests

S220 — Parse the plurality of task requests to derive a data length and a designated task of each task request S230 — Read a task-specific parameter set and a shared model parameter set of the designated task of each task request from the memory S240 — Assign a plurality of first task requests of the plurality of task requests corresponding to a same shared model to a plurality of computation batches S250 — Perform, in a manner of batch, a common computation of a plurality of designated tasks of the first task requests in each computation batch according to a first shared model parameter set S260 — Perform a plurality of task-specific computation operations according to a plurality of task-specific parameter sets of the designated tasks of the first task requests in each computation batch

FIG. 2

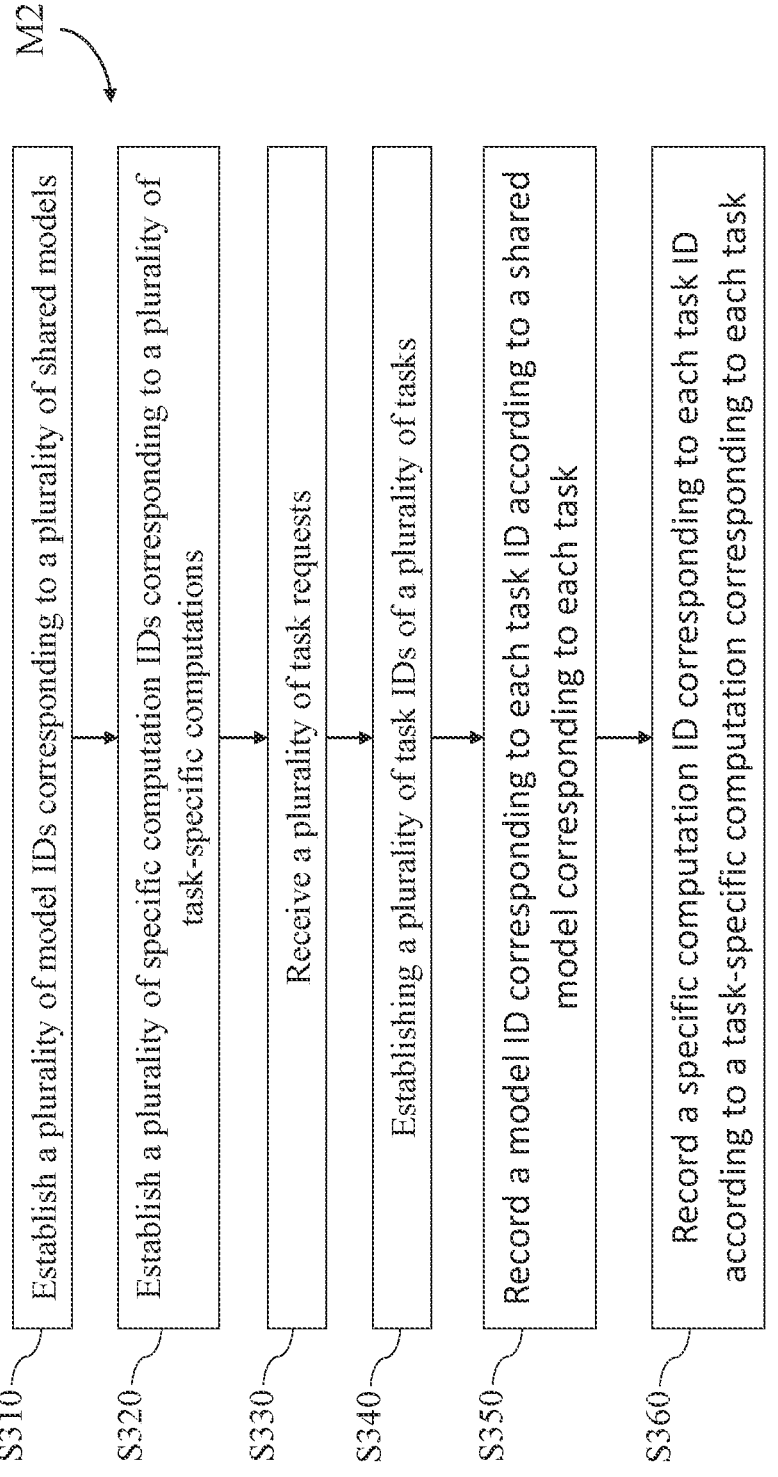

S310 — Establish a plurality of model IDs corresponding to a plurality of shared models S320 — Establish a plurality of specific computation IDs corresponding to a plurality of task-specific computations S330 — Receive a plurality of task requests S340 — Establishing a plurality of task IDs of a plurality of tasks S350 — Record a model ID corresponding to each task ID according to a shared model corresponding to each task S360 — Record a specific computation ID corresponding to each task ID according to a task-specific computation corresponding to each task

| Task ID | Module ID | Specific computation ID |
|---------|-----------|-------------------------|
| SB1A | SM1 | SC1 |
| SB2A | SM1 | SC2 |
| ⋮ | | |
| SBNA | SM1 | SC3 |
| SB1B | SM2 | SC4 |
| SB2B | SM2 | SC1 |
| ⋮ | | |
| SBLB | SM2 | SC3 |

TSK1A →
TSK2A →
⋮
TSKNA →
TSK1B →
TSK2B →
⋮
TSKLB →

FIG. 5

BATCH COMPUTING SYSTEM AND ASSOCIATED METHOD

CROSS-REFERENCE TO RELATED APPLICATIONS

This application claims priority of China application No. 202210850588.4, filed on Jul. 19, 2022, which is incorporated by reference in its entirety.

TECHNICAL FIELD

The present disclosure relates to a batch computing system, and particularly to a batch computing system capable of supporting multiple tasks generated by a parameter-efficient transformer model.

BACKGROUND

Super-large deep learning models based on transformers have shown better performance in many computing domains, such as natural language processing. However, super-large transformer models consume a lot of storage resources; thus, it is still very difficult to deploy transformer models to service systems and support various downstream tasks required by users. To solve this problem, a parameter-efficient transformer (PET) model has been proposed. The concept of PET model is based on a pre-trained model with task-related fine-tuning, such as adding a small number of computations and parameters, for different tasks. Since the fragment derived from each task usually accounts for only 5% of the storage space required by the original full model, the required storage resources can be greatly reduced. However, since different tasks may perform different computations, it is difficult for traditional inference service systems to process requests from different users in parallel in a batch fashion, resulting in poor system performance. Therefore, how to provide a service system that can efficiently perform various tasks of the PET model has become an urgent issued to be solved in the related field.

SUMMARY

One embodiment of the present disclosure discloses a batch computing system. The batch computing system includes a memory, a task manager, and an inference computer. The memory is configured to store a first shared model parameter set corresponding to a plurality of first tasks in common and a task-specific parameter set corresponding to each first task in the plurality of first tasks, wherein the plurality of first tasks are generated by fine tuning the first shared model. The task manager is configured to access parameters stored in the memory. The inference computer includes a preprocessing module, a batch assignment module, and an inference execution module. The preprocessing module is configured to, in a service stage, receive a plurality of task requests, parse the plurality of task requests to derive a data length and an designated task for each task request, and enable the task manager to read a task-specific parameter set and a shared model parameter set of the designated task of each task request. The batch assignment module is configured to assign a plurality of first task requests of the plurality of task requests that are corresponding to the first shared model to a plurality of computation batches. The inference execution module is configured to perform a common computation for a plurality of designated tasks of a plurality of first task requests in each computation batch in batch according to the first shared model parameter set, and perform task-specific computation operations for the plurality of designated tasks of the plurality of first task requests in each computation batch.

Another embodiment of the present disclosure discloses an inference service method. The method includes, in a registration stage, storing a first shared model parameter set corresponding to a plurality of first tasks in common and a task-specific parameter set of each first task of the plurality of first tasks in a memory, wherein the plurality of first tasks are generated by fine tuning a first shared model, in a service stage, receiving a plurality of task requests, parsing the plurality of task requests to derive a data length and a designated task of each of the plurality of task requests, reading a task-specific parameter set and a shared model parameter set of the designated task of each of the plurality of task requests from the memory, assigning a plurality of first task requests of the plurality of task requests corresponding to the first shared model to a plurality of computation batches, performing, in batch, a common computation of a plurality of designated tasks of a plurality of first task requests of each of the plurality of computation batches according to the first shared model parameter set, and performing a plurality of task-specific computation operations according to a plurality of task-specific parameter sets of the plurality of designated tasks of the plurality of first task requests in each of the plurality of computation batches.

The batch data computing system and associated methods of the present disclosure can classify the received task requests according to the model used by the task, thereby avoiding repeated access to the same parameters. In addition, the batch data computing system and associated methods provided in this disclosure not only allow to perform common computations for multiple task requests having different designated tasks in batches, but also allow to perform task-specific computations for multiple task requests having the same designated task in batches, thereby improving the overall computation performance.

BRIEF DESCRIPTION OF THE DRAWINGS

Aspects of the present disclosure are best understood from the following detailed description when read with the accompanying figures. It should be noted that, in accordance with the standard practice in the field, various structures are not drawn to scale. In fact, the dimensions of the various structures may be arbitrarily increased or reduced for clarity of discussion.

FIG. 2 is a flowchart of an inference service in a service stage according to embodiments of the present disclosure.

FIG. 4 is a flowchart of an inference service in a registration stage according to embodiments of the present disclosure.

FIG. 5 is a schematic diagram illustrating a task-model-computation reference table generated as a result of the registration module completing the registration stage.

DETAILED DESCRIPTION

Figure 1:
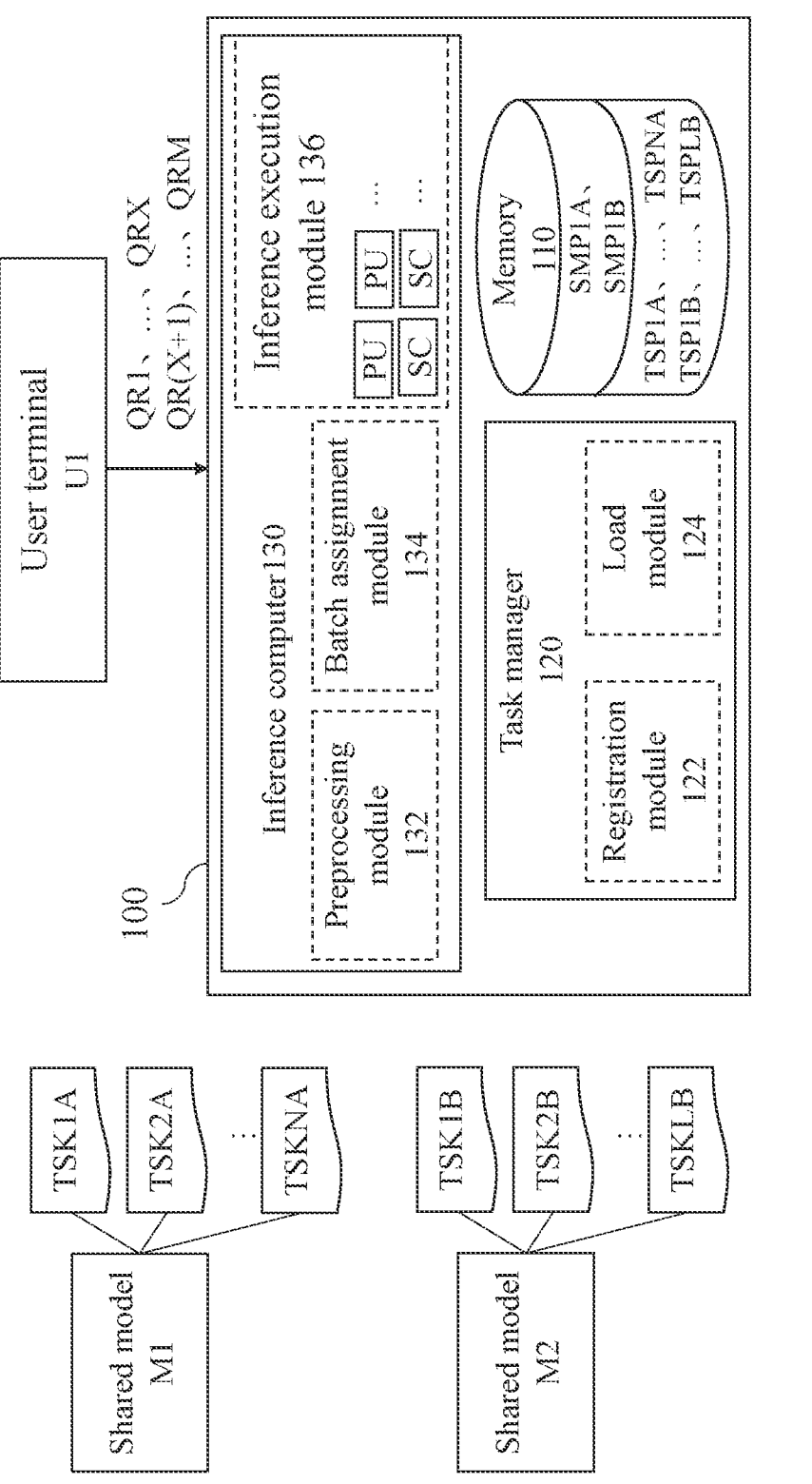
FIG. 1 is a schematic diagram illustrating a batch computing system of one embodiment of the present disclosure.

The following disclosure provides various different embodiments or examples for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various embodiments. This repetition is for the purpose of simplicity and clarity and does not in itself dictate a relationship between the various embodiments and/or configurations discussed.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "generally" means within an acceptable standard error of the mean when considered by one of ordinary skill in the art. As could be appreciated, other than in the operating/working examples, or unless otherwise expressly specified, all of the numerical ranges, amounts, values, and percentages (such as those for quantities of materials, duration of times, temperatures, operating conditions, portions of amounts, and the likes) disclosed herein should be understood as modified in all instances by the term "generally." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Here, ranges can be expressed herein as from one endpoint to another endpoint or between two endpoints. All ranges disclosed herein are inclusive of the endpoints, unless specified otherwise.

FIG. 1 is a schematic diagram illustrating a batch computing system of one embodiment of the present disclosure. As shown in FIG. 1, the batch computing system 100 can include a memory 110, a task manager 120 and an inference computer 130. In the present embodiment, the memory 110 can be configured to store parameters required by an inference service, and the inference computer 130 can, when receiving task requests sent by a user, parse the task requests to derive tasks designated by the task requests and access the parameter required for performing such tasks from the memory 110 via the task manager 120 so as to perform the corresponding computations.

Moreover, in the present embodiment, the inference computer 130 can be, for example, but is not limited to, a general purpose graphic processing unit (GPGPU) and can have a plurality of processing units PU. In such case, if one can effectively use the batch computation function to enable a plurality of processing units PU to perform computations in parallel, then the computation performance of the batch computing system 100 can be increased. To effectively use the inference computer 130 to perform batch computations, the batch computing system 100 can classify the task requests that it received according to models used by tasks, and divide the computations required by various downstream tasks generated by fine tuning a same parameter-efficient transformer (PET) model into a common computation that all tasks need to perform and task-specific computations specifically required by individual tasks. In this way, in addition to performing batch computation for tasks of the same type, tasks of different types may also be computed in batch, thereby improving the performance of the batch computing system 100.

For example, the batch computing system 100 can be configured to perform a plurality of tasks TSK1A to TSKNA generated in advanced by fine tuning the shared model M1, wherein N is an integer equal to or greater than 1. Since tasks TSK1A to TSKNA are all generated by fine tuning the same shared model M1, the computations performed by tasks TSK1A to TSKNA have certain similarities that can be expressed in a uniform format. In the present embodiment, the shared model M1 may calculate an unknown feature $Y_t$ by using the inputted feature $X_t$ with a weight parameter W and a bias vector b that are generated during a pre-training to, as shown in Equation (0).

$$Y_{t1}=X_t \cdot W+b \qquad \text{Equation (0)}$$

That is, the basic computation of the shared model M1 includes a Vector-Matric Multiplication (MVM) obtained by multiplying the feature $X_t$ (expressed as a vector) by the weight parameter W (expressed as a matrix) and a bias vector addition to add the vector generated by the MVM with the bias vector b.

Moreover, the tasks TSK1A to TSKNA generated based on the shared model M1 can further fine tune the computation contents and/or parameters of Equation (0); for example, the computations required by tasks TSK1A to TSK4A for calculating the unknown feature Yt can be expressed as shown Equation (1) to Equation (4).

$$Y_t=\sigma[(X_t \cdot W+b) \cdot W_{down}] \cdot W_{up} \qquad \text{Equation (1)}$$

$$Y_t=X_t \cdot (M_t \odot W)+b \qquad \text{Equation (2)}$$

$$Y_t=X_t \cdot (W+\delta_t)+(b+b_{t3}) \qquad \text{Equation (3)}$$

$$Y_t=X_t \cdot W+b_{t4} \qquad \text{Equation (4)}$$

In Equation (1), $W_{down}$ and $W_{up}$ are weights that can be obtained by learning, $\sigma$ is the activation function of the task TSK1A; in Equation (2), $M_t$ is a mask specific to the task TSK2A; in Equation (3), the task TSK3A uses the specific weight $\delta_t$ to fine tune the initial weight value W and uses the specific bias vector $b_{t3}$ to fine tune the initial bias vector b; in Equation (4), the task TSK4A uses the specific bias vector $b_{t4}$ to fine tune the initial bias vector b. That is, although the computations and/or parameters initially defined by the shared model M1 are all fine-tuned in tasks TSK1A to TSK4A, the tasks TSK1A to TSK4A still include the computations initially defined by the shared model M1, as shown in Equation (0). In such case, Equation (1) to Equation (4) can extract the portion that is the same as the Equation (0) as the common computation of tasks TSK1A to TSK4A, whereas the remaining portions can be deemed as the individual task-specific computations of the tasks TSK1A to TSK4A; the re-written Equation (1) is expressed as Equation (5-1) and Equation (5-2), whereas the re-written Equation (2) to Equation (4) can be expressed as shown Equation (6) to Equation (8), respectively.

$$Y_t'=(X_t \cdot W)+b \qquad \text{Equation (5-1)}$$

$$Y_t=\sigma \cdot Y_t' \cdot W_{down} \cdot W_{up} \qquad \text{Equation (5-2)}$$

$$Y_t=X_t \cdot [(1-\overline{M_t}) \odot W]+b=(X_t \cdot W)+b-X_t \cdot (W \odot \overline{M_t}) \qquad \text{Equation (6)}$$

$$Y_t=(X_t \cdot W)+b_{t3}'+(X_t \cdot \delta_t) \qquad \text{Equation (7)}$$

$$Y_t=(X_t \cdot W)+b_{t4} \qquad \text{Equation (8)}$$

In such case, tasks TSK1A to TSK4A in Equation (5-1), Equation (6), Equation (7) and Equation (8) may use the same parameters to perform the MVM computation of $(X_r \cdot W)$, and then perform the computation operations specific to each task after performing the same MVM computation. For example, Equation (5-2) needs to perform another MVM on the calculation result of Equation (5-1), whereas in Equation (6), $M_r \odot W$ in Equation (2) can be first factorized into $(1 - \overline{M_r}) \odot W$, wherein $\overline{M_r}$ is the bit-wise inversion mask of $M_r$, and thus, after performing the MVM computation $(X_r \cdot W)$, the bias vector addition and MVM computation $X_r \cdot (W \odot \overline{M_r})$ are further performed. Moreover, in Equation (7), bias vectors b and $b_{r3}$ in Equation (3) are consolidated as $b_{r3}'$, and hence, after performing the MVM computation $(X_r \cdot W)$, only one bias vector addition and one MVM computation $(X_r \cdot \delta_r)$ are performed. Further, in Equation (8), after performing the MVM computation $(X_r \cdot W)$, the bias vector $b_{r4}$ is used to perform one bias vector addition.

In such case, the memory 110 can store a shared model parameter set SMP1A common to a plurality of tasks TSK1A to TSKNA, such as the weight value W required for the MVM computation $(X_r \cdot W)$ in Equation (5-1), Equation (6), Equation (7) and Equation (8), and can further store a task-specific parameter sets TSP1A to TSPNA specific to tasks TSK1A to TSKNA, such as the mask $\overline{M_r}$ in Equation (6) and the bias vector $b_{r3}'$ and specific weight value $\delta_r$ in Equation (7). Since the parameters that tasks TSK1A to TSKNA requires for performing the common computations are the same, the memory 110 only needs to store one copy of the shared model parameter set SMP1A to enable tasks TSK1A to TSKNA to perform the corresponding common computation; consequently, the storage space required by the batch computing system 100 can be reduced.

Moreover, in some embodiments, the batch computing system 100 can further be configured to perform tasks generated by fine tuning other shared models. For example, the batch computing system 100 can be further configured to perform tasks TSK1B to TSKLB generated by fine tuning the shared model M2, wherein L is an integer equal to or greater than 1. Since tasks TSK1B to TSKLB are downstream tasks of the same shared model M2, similar to the foregoing discussion in relation to tasks TSK1A to TSKNA, tasks TSK1B to TSKLB can also have the same common computation, and task-specific computations specific to each tasks TSK1B to TSKLB. In such case, the memory 110 can also store a shared model parameter set SMP1B and task-specific parameter sets TSP1B to TSPLB of tasks TSK1B to TSKLB.

In the embodiment of FIG. 1, a user terminal U1 can send task requests QR1 to QRM to the batch computing system 100 so as to request the batch computing system 100 to provide inference services to the data that the user terminal U1 inputs according to the designated tasks. For example, the task request QR1 can be configured to request that the batch computing system 100 provide an inference service to the input data using the task TSK1A, whereas the task request QR2 can be configured to request that the batch computing system 100 provide an inference service to the input data using the task TSK3A. In some embodiments, the batch computing system 100 can be configured to provide, for example, inference services related to natural language processing, in which the input data of task requests QR1 to QRM may be a text that needs to be contextually parsed. However, the present disclosure is not limited thereto, in some other embodiments, the batch computing system 100 can also be used to provide inference services in other domains, and the input data of task requests QR1 to QRM can be, for example, but not limited to, images, pictures or audio data.

FIG. 2 is a flowchart of an inference service in a service stage according to embodiments of the present disclosure. As shown in FIG. 2, the method M2 can include Steps S210 to S260, and in the present embodiment, the method M2 can be implemented using the batch computing system 100. As shown in FIG. 1, the inference computer 130 can include a preprocessing module 132, a batch assignment module 134 and an inference execution module 136. In Step S210, the batch computing system 100 can receive a user's task requests QR1 to QRM, and in Step S220, the preprocessing module 132 can parse the task requests QR1 to QRM to ascertain the designated task of each task request QR1 to QRM and the input data length of each task request QR1 to QRM.

In the present embodiment, since the memory 110 has store the parameters required for the computation of each task in advanced, in Step S230, the inference computer 130 can use the task manager 120 to access the memory 110 so as to read a task-specific parameter set and a shared model parameter set of the designated task of each task request QR1 to QRM. For example, if the designated task of the task requests QR1 is the task TSK1A, and the designated task of the task request QR2 is the task TSK3A, then the task manager 120 may read from the memory 110 the task-specific parameter set TSP1A of the task TSK1A and the task-specific parameter set TSP3A of the task TSK3A. Moreover, since the designated tasks of the task requests QR1 and QR2 (i.e., the tasks TSK1A and TSK3A) are both the downstream tasks of a shared model M1, the parameters required by the common computation of the two tasks are the same shared model parameter set SMP1A, the task manager 120 only need to read the shared model parameter set SMP1A once.

Moreover, in some embodiments, the task manager 120 can read the corresponding parameters according to the timing when the inference computer 130 actually performs the computation; for example, in some embodiments, after the task manager 120 loads the shared model parameter set SMP1A, if the batch computing system 100 again receives a task request with an designated task that also corresponds to the shared model M1, then the task manager 120 will not load the shared model parameter set SMP1A for the second time to avoid repetitive operations.

In Step S240, the batch assignment module 134 can assign task requests in the task requests QR1 to QRM that have designate tasks corresponding to a same shared model to computation batches. For example, in task requests QR1 to QRM, if the designated tasks of task requests QR1 to QRX are corresponding to the shared model M1, whereas the designated tasks of task requests QR(X+1) to QRM are corresponding to another shared model M2, then the batch assignment module 134 can assign the task requests QR1 to QRX into a plurality of computation batches, and can further assign the task requests QR(X+1) to QRM into a plurality of computation batches, wherein X is an integer greater than 1 and less than (M−1). That is, the designated tasks of task requests of each computation batch may correspond to the same shared model, and hence, a common computation of a plurality of designated tasks can be performed in a batch manner, thereby increasing the performance of the batch computing system 100.

Figure 3:
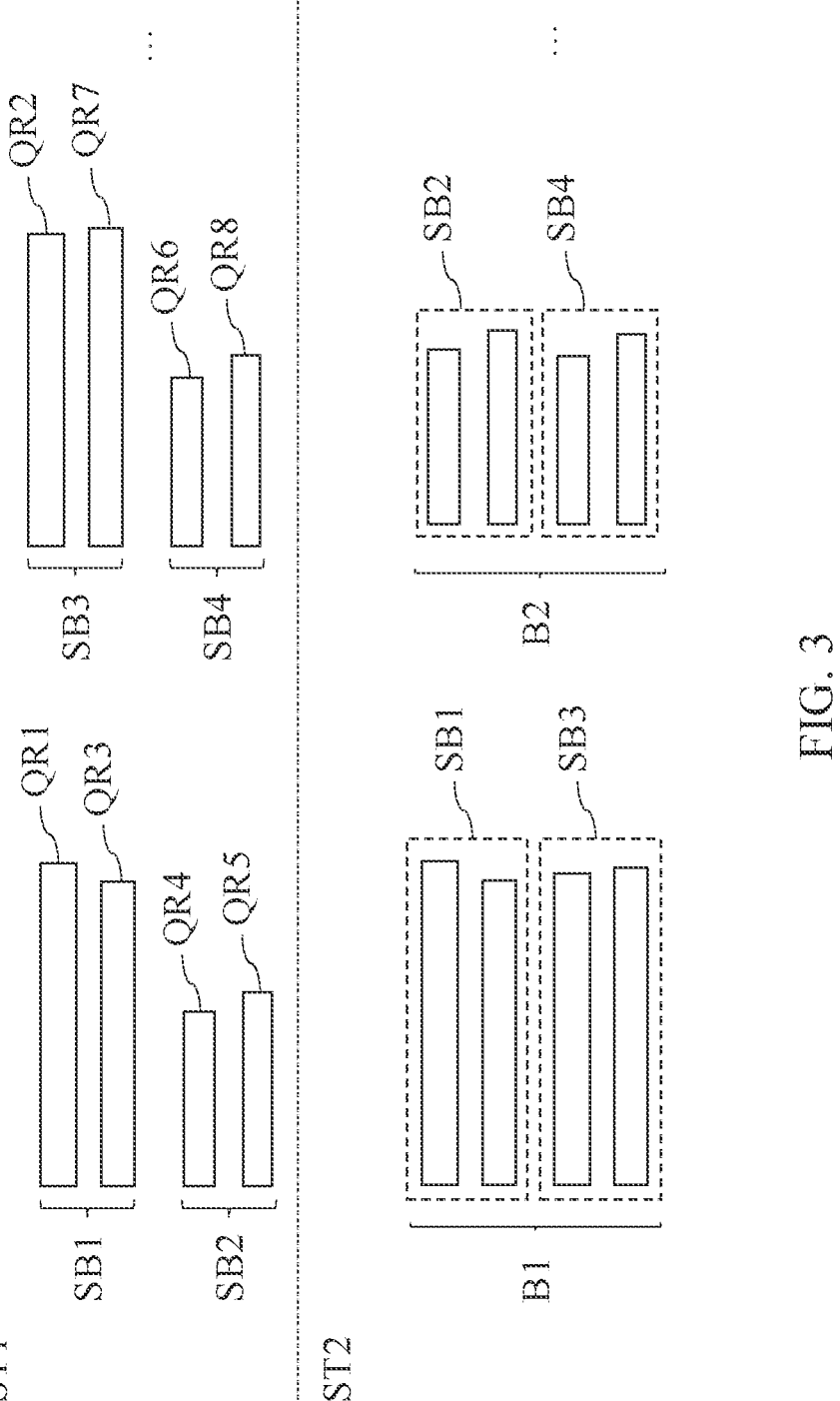
FIG. 3 is a schematic diagram illustrating a batch assignment module performing batch scheduling.

FIG. 3 is a schematic diagram illustrating the batch assignment module 134 performing batch scheduling. As shown in FIG. 3, in the first stage ST1, the batch assignment module 134 can pick task requests that are corresponding to the same shared model M1 and have similar data lengths from the task requests QR1 to QRX to a same sub-computation batch. For example, if the designated tasks of task requests QR1, QR3, QR4, QR5 are all task TSK1A, wherein task requests QR1 and QR3 have similar data lengths, and task requests QR4 and QR5 have similar data lengths, then the batch assignment module 134 can assign task requests QR1 and QR3 into a sub-computation batch SB1, and assigns task requests QR4 and QR5 into a sub-computation batch SB2. Similarly, if the designated tasks of task requests QR2, QR6, QR7, QR8 are all task TSK3A, wherein the task request QR2 and QR7 have similar data lengths, and task requests QR6 and QR8 have similar data lengths, then the batch assignment module 134 can assign task requests QR2 and QR7 into a sub-computation batch SB3, and assign task requests QR6 and QR8 into a sub-computation batch SB4, and so on so forth.

Next, in the second stage ST2 of FIG. 3, the batch assignment module 134 can assemble a plurality of sub-computation batches having similar data lengths but with different designated tasks into a same computation batch. For example, the designated tasks of task requests QR1 and QR3 of the sub-computation batch SB1 are both task TSK1A, which is different from the task TSK3A of the designated tasks of the task requests QR2 and QR7 in the sub-computation batch SB3; however, the data lengths of task requests QR1 and QR3 are similar to that of the task request QR2 and QR7; thus, the batch assignment module 134 can assemble the sub-computation batches SB1 and SB3 into a same computation batch B1. Similarly, the batch assignment module 134 can assemble the sub-computation batches SB2 and SB4 into a same computation batch B2, and so on so forth. As a result, other sub-computation batches can be assembled into corresponding computation batches accordingly. In the present embodiment, each of the computation batches B1 and B2 can include four task requests; however, the present disclosure is not limited thereto, and in some other embodiments, each computation batch can include more numbers of task requests according to the batch computation capability of the inference execution module 136, such as the amount of processing units PU therein.

Since task requests with the same designated task require the same task-specific computation, if task requests with the same designated task are assigned into the same batch, it is more likely to perform more computations in a batch manner. Moreover, since the data length of the input data will affect the computation time to a considerable extent, assigning task requests with similar data lengths into the same batch can effectively reduce the waiting time of other task requests in the same batch, thereby improving the efficiency of batch computations.

After completing the assignment of the computation batches, in Step S250, the inference execution module 136 can perform the common computation of the designated tasks of the task requests in each batch computation in a batch manner according to the shared model parameter set that the task requests therein correspond to. For example, the designated tasks of task requests QR1, QR3, QR2 and QR7 of the computation batch B1 are respectively tasks TSK1A and TSK3A. However, since the tasks TSK1A and TSK3A are generated by fine tuning the same shared model M1, these two tasks still have common computations that can be performed according to the same parameter, such as the MVM $(X_i \cdot W)$ as shown in Equation (5-1) and Equation (7). Therefore, in Step S250, the inference execution module 136 can utilize a plurality of processing units PU to perform common computations of the designated tasks of task requests QR1, QR3, QR2 and QR7 in the computation batch B1 in a batch manner according to the shared model parameter set SMP1A corresponding to the task requests QR1, QR3, QR2 and QR7.

Next, in Step S260, the inference execution module 136 can perform corresponding task-specific computation operations according to task-specific parameter sets corresponding to the designated tasks the task requests in each batch computation. For example, since the designated tasks of task requests QR1 and QR3 are both task TSK1A, after the inference execution module 136 performs the common computation of the tasks TSK1A and TSK3A in Step S250, it may further perform the task-specific computation of the task TSK1A in Step S260, such as another MVM in Equation (5-2). Similarly, since the designated tasks of the task requests QR2 and QR7 are the task TSK3A, after the inference execution module 136 performs the common computation of the tasks TSK1A and TSK3A in Step S250, it may further perform the task-specific computation of the task TSK3A in Step S260, such as the MVM in Equation (7).

Moreover, since each batch computation can include a plurality of sub-computation batches, and task requests in each sub-computation batch have the same type of designated tasks, in Step S260, the inference execution module 136 can also perform the task-specific computation of the task TSK1A designated by task requests QR1 and QR3 in the sub-computation batch SB1 in a manner of a smaller batch. Similarly, in Step S260, the inference execution module 136 can also perform the task-specific computation of the task TSK3A designated by the task requests QR2 and QR7 in the sub-computation batch SB3 in a batch manner. As a result, the batch computing system 100 can not only perform the common computation task requests having different designated tasks in batch, but also perform the task-specific computations of task requests having the same designated task in batch, thereby increasing the likelihood of performing computations in batches and improve the computation performance of the batch computing system 100.

Generally, since the common computations of downstream tasks often involve vector matrix multiplications with high computational effort, the performance of the batch computing system 100 can be effectively improved by performing common computations of different tasks in a batch manner. Furthermore, task-specific computations are usually simpler, for example, the task-specific computations in Equation. (6) and Equation (7) only require sparse vector matrix multiplication, and the task-specific computation in Equation (8) only require simple bias vector addition, so it can help to improve the overall performance of the computations even if there are fewer tasks in the sub-computation batch that can be computed in a batch manner. In some embodiments, the inference execution module 136 may further include a plurality of specific computation modules SC designed for specific computations; the task-specific computation modules SC may be used to perform the task-specific computations corresponding to different tasks, such as vector addition or multiplication of sparse matrices, thereby enabling the inference execution module 136 to perform task-specific computations more efficiently.

In the embodiment of FIG. 2, since the parameters required for the computations of the tasks are stored in the memory 110 in advance, the batch computing system 100 can proceed to the service stage to provide inference services directly. However, in some other embodiments, the batch computing system 100 may further manage and record the required parameters and the contents of the computations for different tasks during a registration stage with the registration module 122 of the task manager 120, and correspondingly store the required parameter of each task into the memory 110.

FIG. 4 is a flowchart of an inference service in a registration stage according to embodiments of the present disclosure; FIG. 5 is a schematic diagram illustrating a task-model-computation reference table generated as a result of the registration module 112 completing the registration stage. In the present embodiment, the method M3 can include Steps S310 to S360, but is not limited to the order of execution shown in FIG. 4.

In Step S310, the registration module 122 can establish model IDs for a plurality of shared models, and then in Step S320, establish specific computation IDs corresponding to a plurality of task-specific computations. For example, the registration module 122 can establish the respective model IDs "SM1" and "SM2" for the shared models M1 and M2, and can establish the IDs for the task-specific computations in Equation (5-2), Equation (6), Equation (7) and Equation (8). For example, the registration module 122 may establish a specific computation ID named "SC1" to refer the sparse MVM in Equation (6) and Equation (7), and establish a specific computation serial ID named "SC2" to refer the bias vector addition in Equation (7) and Equation (8).

Next, in Step S330, the batch computing system 100 can receive a plurality of pre-trained tasks TSK1A to TSKNA and tasks TSK1B to TSKLB, wherein tasks TSK1A to TSKNA can be the downstream tasks of the shared model M1, and tasks TSK1B to TSKLB can be the downstream tasks of the shared model M2. In Step S340, the registration module 122 can establish task IDs "SB1A" to "SBNA" corresponding to the received tasks TSK1A to TSKNA, so that the registration module 122 can use task IDs "SB1A" to "SBNA" as indexes to respectively record the shared model M1 of the tasks TSK1A to TSKNA with the model ID "SM1" and record the specific computations of the tasks TSK1A to TSKNA with the specific computation IDs, such as "SC1", "SC2" and "SC3", in Steps S350 and S360, as shown in FIG. 5. Similarly, in Step S340, the registration module 122 can establish task IDs "SB1B" to "SBLB" corresponding to the received tasks TSK1B to TSKLB, so that the registration module 122 can use task IDs "SB1B" to "SBLB" as an indexes to respectively record the shared model M1 of the tasks TSK1B to TSKLB with the model ID "SM2" and record the specific computations of the tasks TSK1B to TSKNB with the specific computation IDs, such as "SC1", "SC3" and "SC3" in Steps S350 and S360, as shown in FIG. 5.

Consequently, the task manager 120 can retrieve the shared model and task-specific computation corresponding to each task by referring the task ID of the task. Correspondingly, when the user terminal U1 makes a task request, it only needs to include the task IDs of the designated tasks in the task requests QR1 to QRM. For example, the task requests QR1 may include the task ID "SB1A" for referring the designated task TSK1A. In such case, the batch computing system 100 can be aware of the corresponding designated task for each task request. For example, in the service stage, the preprocessing module 132 in the inference computer 130 can identify that the designated task of the task request QR1 is task TSK1A simply by parsing the task ID "SB1A" in task request QR1, and can transfer the task ID "SB1A" to the task manager 120. Accordingly, the load module 124 in the task manager 120 can read the shared model parameter set SMP1A and task-specific parameter set TSP1A for the designated task of the task request QR1 from the memory 110 according to the task ID "SB1A".

In some embodiments, since task requests corresponding to the same shared model require only one copy of the shared model parameter set SMP1A and the amount of data in the task-specific parameter set TSP1A is typically lower, the loading module 124 may load the shared model parameter set SMP1A and the task-specific parameter set TSP1A directly into the memory in the inference computer 130, such as the memory in GPU, for subsequent computations.

In addition, the task manager 120 can retrieve the corresponding model ID using the task ID in the task request, so as to identify what kind of downstream task and what kind of shared model that the designated task of the task request belongs to. Therefore, the batch assignment module 134 can also assign the computation batches according to the shared model corresponding to each task. Furthermore, the inference execution module 136 can also identify what task-specific computation each task should perform according to the specific computation ID corresponding to each task ID, thereby selecting a corresponding specific computation module to perform the task-specific computation for each task. In some embodiments, the task manager 120, the registration module 122, and the load module 124 may be implemented by way of a computer.

In summary, the batch computing system and associated method provided by the embodiments of the present disclosure can classify the task requests that it received based on the model used by the task, thereby avoiding repeated access to the same parameters. Moreover, the batch computing system and associated method provided by the embodiments of the present disclosure can perform common computations for a plurality of task requests that have different designated tasks in batches, and can further perform task-specific computations for a plurality of task requests that have the same designated tasks in batches, thereby improving the overall computation performance.

The foregoing description briefly sets forth the features of some embodiments of the present disclosure so that persons having ordinary skill in the art more fully understand the various aspects of the disclosure of the present disclosure. It will be apparent to those having ordinary skill in the art that they can easily use the disclosure of the present disclosure as a basis for designing or modifying other processes and structures to achieve the same purposes and/or benefits as the embodiments herein. It should be understood by those having ordinary skill in the art that these equivalent implementations still fall within the spirit and scope of the disclosure of the present disclosure and that they may be subject to various variations, substitutions, and alterations without departing from the spirit and scope of the present disclosure.

What is claimed is:

1. A batch computing system, comprising:
a memory, configured to store a first shared model parameter set corresponding to a plurality of first tasks in common and a task-specific parameter set corresponding to each first task in the plurality of first tasks, wherein the plurality of first tasks are generated by fine tuning the first shared model;
a task manager, configured to access parameters stored in the memory; and
an inference computer, comprising:
a preprocessing module, configured to, in a service stage, receive a plurality of task requests, parse the plurality of task requests to derive a data length and a designated task for each task request, and enable the task manager to read a task-specific parameter set and a shared model parameter set of the designated task of each task request;

a batch assignment module, configured to assign a plurality of first task requests of the plurality of task requests that are corresponding to the first shared model to a plurality of computation batches; and an inference execution module, configured to perform a common computation for a plurality of designated tasks of first task requests in each computation batch in batch according to the first shared model parameter set, and perform task-specific computation operations for the plurality of designated tasks of the first task requests in each computation batch, wherein, the batch assignment module first assembles a plurality of first task requests of the plurality of first task requests corresponding to a same first task and having similar data lengths to a same sub-computation batch, and then assembles a plurality of sub-computation batches having similar data lengths and different designated tasks to a computation batch of the plurality of computation batches.

2. The batch computing system of claim 1, wherein the task manager comprises a registration module, configured to, in a registration stage, receive the plurality of first tasks, establish a plurality of first task identifications (IDs) of the plurality of first tasks, and use the plurality of first task IDs as indexes to record the first shared model and task-specific computations corresponding to the plurality of first tasks.

3. The batch computing system of claim 2, wherein the registration module is further configured to, in the registration stage, receive a plurality of second tasks generated by fine tuning a second shared model, establish a plurality of second task IDs of the plurality of second tasks, and use the plurality of second task IDs as indexes to record the second shared model and task-specific computations corresponding to the plurality of second tasks.

4. The batch computing system of claim 3, wherein the registration module is further configured to, in the registration stage, establish a model ID corresponding to the first shared model and a model ID corresponding to the second shared model, and record a model ID corresponding to each task ID according to a shared model corresponding to each task of the plurality of first tasks and the plurality of second tasks.

5. The batch computing system of claim 3, wherein the registration module is further configured to, in the registration stage, establish a plurality of specific computation IDs corresponding to a plurality of task-specific computations, and record a specific computation ID corresponding to each task ID according to a task-specific computation corresponding to each task of the plurality of first tasks and the plurality of second tasks.

6. The batch computing system of claim 2, wherein:

each task request of the plurality of task requests comprises a designated task ID of a designated task and an input data requesting an inference service.

7. The batch computing system of claim 6, wherein:

in the service stage, the preprocessing module transfers a plurality of task IDs of the plurality of task requests to the task manager; and the task manager further comprises a load module, configured to, in the service stage, read a shared model parameter set and a task-specific parameter set of the designated task of each task request from the memory according to the plurality of task IDs.

8. The batch computing system of claim 1, wherein the inference execution module further comprises a plurality of specific computation modules, configured to perform a plurality of task-specific computation operations corresponding to the plurality of first tasks.

9. An inference service method, comprising:

in a registration stage, storing a first shared model parameter set corresponding to a plurality of first tasks in common and a task-specific parameter set of each first task of the plurality of first tasks in a memory, wherein the plurality of first tasks are generated by fine tuning a first shared model;

in a service stage, receiving a plurality of task requests;

parsing the plurality of task requests to derive a data length and a designated task of each of the plurality of task requests;

reading a task-specific parameter set and a shared model parameter set of the designated task of each of the plurality of task requests from the memory;

assigning a plurality of first task requests of the plurality of task requests corresponding to the first shared model to a plurality of computation batches;

performing, in a manner of batch, a common computation of a plurality of designated tasks of first task requests in each of the plurality of computation batches according to the first shared model parameter set; and performing a plurality of task-specific computation operations according to a plurality of task-specific parameter sets of the plurality of designated tasks of the first task requests in each of the plurality of computation batches, wherein the step of assigning the plurality of first task requests of the plurality of task requests to the plurality of computation batches comprises:

assembling a plurality of first task requests of the plurality of first task requests that are corresponding to a same first task and having similar data lengths to a same sub-computation batch; and assembling a plurality of sub-computation batches having similar data lengths and different designated tasks to a same computation batch of the plurality of computation batches.

10. The method of claim 9, further comprising:

in the registration stage, receiving the plurality of first tasks;

establishing a plurality of first task identifications (ID) of the plurality of first tasks; and using the plurality of first task IDs as indexes to record a shared model and task-specific computations corresponding to the plurality of first tasks.

11. The method of claim 10, further comprising:

in the registration stage, receiving a plurality of second tasks generated by fine tuning a second shared model;

establishing a plurality of second task IDs of the plurality of second tasks; and using the plurality of second task IDs as indexes to record a shared model and task-specific computations corresponding to the plurality of second tasks.

12. The method of claim 11, further comprising:

in the registration stage, establishing a model ID corresponding to the first shared model and a model ID corresponding to the second shared model; and recording a model ID corresponding to each task ID according to a shared model corresponding to each task of the plurality of first tasks and the plurality of second tasks.

13. The method of claim 11, further comprising:

in the registration stage, establishing a plurality of specific computation IDs corresponding to a plurality of task-specific computations; and recording a specific computation ID corresponding to each task ID according to a task-specific computation corresponding to each task of the plurality of first tasks and the plurality of second tasks.

14. The method of claim 10, wherein:

each task request of the plurality of task requests comprises a designated task ID of a designated task and an input data requesting an inference service.

* * * * *